United States Patent
Tillkorn et al.

(10) Patent No.: US 11,169,387 B2
(45) Date of Patent: Nov. 9, 2021

(54) OPTICAL ASSEMBLY FOR VARIABLY GENERATING A MULTI-FOCUS PROFILE

(71) Applicant: TRUMPF Laser GmbH, Schramberg (DE)

(72) Inventors: Christoph Tillkorn, Villingendorf (DE); Daniel Flamm, Kornwestheim (DE); Julian Hellstern, Rottweil (DE); Andreas Heimes, Renningen (DE); Li-Wen Chang, Stuttgart (DE); Maike Prossotowicz, Aichhalden (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 17/149,769

(22) Filed: Jan. 15, 2021

(65) Prior Publication Data

US 2021/0165234 A1 Jun. 3, 2021

Related U.S. Application Data

(63) Continuation of application No. PCT/EP2019/069380, filed on Jul. 18, 2019.

(30) Foreign Application Priority Data

Jul. 18, 2018 (DE) ............ 10 2018 211 972.4

(51) Int. Cl.
*G02B 27/09* (2006.01)
*G02B 3/00* (2006.01)
*G02B 27/28* (2006.01)

(52) U.S. Cl.
CPC ....... *G02B 27/0933* (2013.01); *G02B 3/0006* (2013.01); *G02B 27/285* (2013.01)

(58) Field of Classification Search
CPC ................ G02B 27/09; G02B 27/0926; G02B 27/0933; G02B 27/0938; G02B 27/095;
(Continued)

(56) References Cited

U.S. PATENT DOCUMENTS 7,027,228 B2 * 4/2006 Mikhailov ........... G02B 6/4204
359/619
9,851,571 B1 * 12/2017 Zhang ................ G02B 27/0927
(Continued)

FOREIGN PATENT DOCUMENTS

| DE | 19961918 A1 | 7/2001 |
| KR | 100720868 B1 | 5/2007 |

OTHER PUBLICATIONS

Lindlein, et al., "Flexible Beam Shaping System Using Fly's Eye Condenser," *Applied Optics* 49, 12: 2382-2390 (Apr. 20, 2010). XP001553194.
(Continued)

*Primary Examiner* — Robert E. Tallman
(74) *Attorney, Agent, or Firm* — Leydig, Voit & Mayer, Ltd.

(57) ABSTRACT

An optical assembly includes a beam path, passing, in succession, through multiple microlens arrays and a Fourier lens assembly. The microlens arrays have a uniform aperture of their microlenses, and the entirety of the microlens arrays has an effective focal length. The optical assembly further includes an adjustment mechanism, configured to adjust a mutual optical distance of at least some of the microlens arrays in the beam path, thereby setting the effective focal length of the entirety of the microlens arrays. The adjustment mechanism has multiple adjustment positions i=1, . . . , M wherein M is a natural number ≥2, i is an adjustment position index, at which the term (Continued)

$$\frac{a^2}{\lambda \cdot f_{ML,i}}$$

in each case essentially smoothly results in a natural number $N_i$. $\lambda$ is a center wavelength, $f_{ML,i}$ is an effective focal length $f_{ML}$ of the entirety of the microlens arrays set by the adjustment position i.

23 Claims, 9 Drawing Sheets

(58) Field of Classification Search
CPC ............ G02B 27/0955; G02B 27/0961; G02B 27/0966
See application file for complete search history.

(56) References Cited

U.S. PATENT DOCUMENTS

| | | | |
|---|---|---|---|
| 9,945,988 B2* | 4/2018 | Powell | G02B 27/0075 |
| 2004/0156130 A1* | 8/2004 | Powell | G02B 3/0056 |
| | | | 359/845 |
| 2005/0200820 A1 | 9/2005 | Gui | |
| 2006/0209310 A1* | 9/2006 | Muenz | B23K 26/0738 |
| | | | 356/521 |
| 2012/0013880 A1 | 1/2012 | Choi | |

OTHER PUBLICATIONS

Besold, et al., "Fractional Talbot Effect for Periodic Microlens Arrays," *Optical Engineering* 36, 4 (Apr. 1, 1997). XP000700920.
Zimmermann, et al., "Refractive Micro-Optics for Multi-Spot and Multi-Line Generation," *Suss-Microoptics* (Jun. 20, 2008). XP055629518.

* cited by examiner

OPTICAL ASSEMBLY FOR VARIABLY GENERATING A MULTI-FOCUS PROFILE

CROSS-REFERENCE TO PRIOR APPLICATIONS

This application is a continuation of International Patent Application No. PCT/EP2019/069380, filed on Jul. 18, 2019, which claims priority to German Patent Application No. DE 10 2018 211 972.4, filed on Jul. 18, 2018. The entire disclosure of both applications is hereby incorporated by reference herein.

FIELD

The disclosure relates to an optical assembly for generating a multi-focus profile from an at least essentially collimated laser beam, wherein the optical assembly provides a beam path, successively passing through multiple microlens arrays, wherein the microlens arrays have a uniform aperture a of their microlenses, and wherein the entirety of the microlens arrays has an effective focal length $f_{ML}$, and a Fourier lens assembly.

BACKGROUND

Such an assembly is known from M. Zimmermann et al., "Refractive Micro-optics for Multi-spot and Multi-line Generation", Proceedings of LPM2008-the 9th International Symposium on Laser Precision Microfabrication".

Laser processes are used in a variety of ways in modern manufacturing methods. Laser sources represent a significant cost factor in this case. The productivity can be increased by the parallelization of laser processes in this case. A laser beam can be divided into multiple partial beams by so-called array generators.

M. Zimmermann et al. propose an optical assembly in the so-called fly's eye geometry having two microlens arrays of the same focal length, which are arranged at a distance corresponding to this focal length. An incoming laser beam passes the two microlens arrays and a Fourier lens. Multiple foci having approximately uniformly distributed intensity are generated in the focal plane thereof.

In many applications for laser processes, the number of the required foci can vary depending on the production task. In the optical assembly known from M. Zimmermann et al., however, the number of foci provided is established by the two microlens arrays used.

DE 199 61 918 A1 describes a variable double-focus shaping module. Refractive elements are used as a variable optical wedge. The refractive elements are formed by two cylinder lenses displaceable in relation to one another.

KR 100 720 868 B1 describes a laser system for healing purposes, wherein a microlens array is used to divide a laser beam onto multiple laser spots.

SUMMARY

In an embodiment, the present disclosure provides an optical assembly for generating a multi-focus profile from an at least essentially collimated laser beam. The optical assembly comprises a beam path, passing, in succession, through multiple microlens arrays and a Fourier lens assembly. The microlens arrays have a uniform aperture a of their microlenses, and the entirety of the microlens arrays has an effective focal length fML. The optical assembly further includes an adjustment mechanism, configured to adjust a mutual optical distance of at least some of the microlens arrays in the beam path, thereby setting the effective focal length fML of the entirety of the microlens arrays. The adjustment mechanism has multiple adjustment positions i=1, ..., M, wherein M is a natural number ≥2, i is an adjustment position index, at which the term $$\frac{a^2}{\lambda \cdot f_{ML,i}}$$

in each case essentially smoothly results in a natural number $N_i$. $\lambda$ is a center wavelength of the laser beam, fML,i: effective focal length fML of the entirety of the microlens arrays set by the adjustment position i.

The present disclosure provides an optical assembly with the use of which a number of foci generated from a laser beam can be varied in a simple manner, and wherein a uniform intensity distribution can be obtained.

According to the present disclosure, an optical assembly of the type mentioned at the outset can be characterized in that the optical assembly has an adjustment mechanism, using which a mutual optical distance of at least some of the microlens arrays in the beam path is adjustable, so that the effective focal length $f_{ML}$ of the entirety of the microlens arrays is settable, and the adjustment mechanism has multiple adjustment positions i=1, ..., M, where M: a natural number ≥2 and i: adjustment position index, at which the term $$\frac{a^2}{\lambda \cdot f_{ML,i}}$$

in each case essentially smoothly results in a natural number $N_i$ where $\lambda$: center wavelength of the laser beam, $f_{ML,i}$: effective focal length $f_{ML}$ of the entirety of the microlens arrays set by the adjustment position i.

In summary, the present disclosure proposes providing an optical assembly with an adjustment mechanism, in order to adjust the optical distances of at least some microlens arrays (also referred to as multi-lens arrays) in the beam path. The effective focal length of the entirety of the microlens arrays and thus the number of the foci in the multi-focus profile (multi-spot profile) is thus settable. By suitable selection of the adjustment positions, it is made possible for a uniform intensity distribution to be achieved over the foci.

BRIEF DESCRIPTION OF THE DRAWINGS

Embodiments of the present disclosure will be described in even greater detail below based on the exemplary figures. The present invention is not limited to the exemplary embodiments. All features described and/or illustrated herein can be used alone or combined in different combinations in embodiments of the present invention. The features and advantages of various embodiments will become apparent by reading the following detailed description with reference to the attached drawings which illustrate the following.

DETAILED DESCRIPTION

Figure 1:
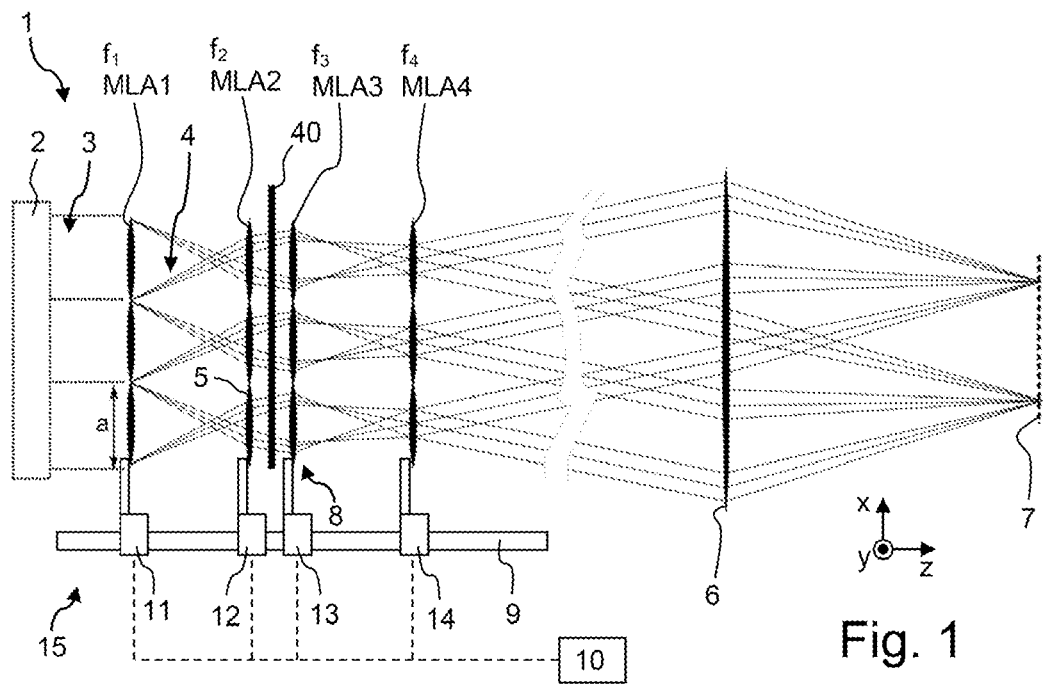
FIG. 1 shows an embodiment of an optical assembly having four microlens arrays in the beam path.

Using the multiple microlens arrays, an angle spectrum is generated from the (at least essentially) collimated laser beam which angle spectrum is imaged using the Fourier lens assembly in a focal plane (typically at an exit pupil). The microlens arrays array microlenses in (at least) one direction perpendicular to the beam propagation direction. In the focal plane, a multi-focus profile having uniform focus intervals is generated, wherein the foci are arrayed (at least) in the direction perpendicular to the beam propagation direction.

In the simplest case, a multi-focus line profile is generated, having foci on a shared line, arrayed in the direction in which the microlenses (formed as cylinder lenses, for example) are also arrayed; however, it is also possible to generate a two-dimensional multi-focus profile ("grid profile") if microlenses are arrayed in multiple, linearly independent directions; in this case, separate microlens arrays can be provided for each of the two directions, for example cylinder lens arrays crossed at 90°, or also shared microlens arrays having lens curvature for both directions. The multi-focus generations in both directions are in principle independent of one another. In the following, for simplification the multi-focus generation is therefore described with respect to one direction (or with respect to one plane which contains the beam propagation direction and this direction).

If the term $$\frac{a^2}{\lambda \cdot f_{ML,i}},$$

which corresponds to four times the Fresnel number FN of the microlens arrays, at least essentially results in a smooth (integer) natural number $N_i$, the illumination of the foci in the multi-focus profile is thus particularly uniform, i.e. an approximately equal intensity is achieved at each of the foci (typically with a range of variation of less than 20%, preferably less than 10%, in relation to the focus having the greatest intensity). Moreover, there are hardly any interfering edge fields.

In a multi-focus line profile, the natural number $N_i$ corresponding to the adjustment position i corresponds to the number of the foci (if $N_i$ is odd directly and if $N_i$ is even together with a phase shifter, see below). For two-dimensional microlens arrays this applies accordingly to each of the spatial directions, in which the microlenses are arrayed.

The effective focal length $f_{ML}$ of the entirety of the microlens arrays can be changed via the adjustment mechanism, and in particular a different natural number can be set for the term $$\frac{a^2}{\lambda \cdot f_{ML,i}},$$

in order to change the number of the foci in a simple manner and adapt to a next work task. The entirety of the microlens arrays is also referred to as an imaging homogenizer.

It is thus not necessary to select precisely two microlens arrays having equal focal length and to arrange them at a distance of this focal length in order to generate a multi-focus line profile.

The adjustment mechanism typically has guides (such as rails) and/or slides for microlens array components and/or mirrors and/or other beam-guiding components, preferably also sensors for checking the position of these components; a motorization and electronic control of the adjustment mechanism is particularly preferably configured. The adjustment positions i are typically fixed by mechanical locks or by electronic programming. Adjustment positions are typically settable for at least three, preferably at least five, particularly preferably at least ten different numbers of foci.

The effective focal length $f_{ML}$ relates to a beam bundle for respectively one microlens of each microlens array in the beam path. An optical assembly according to the disclosure (without the Fourier lens assembly), in relation to a beam bundle for respectively one microlens of each microlens array in the beam path, typically has in the notation of matrix optics, i.e., as an imaging matrix $$\begin{pmatrix} A & B \\ C & D \end{pmatrix},$$

the following properties: D=0; |C|=1/$f_{ML}$. Furthermore A<1 usually also applies (for an essentially collimated beam); B then results as a function of A, C, and D.

Using the adjustment mechanism, the effective focal length $f_{ML}$ of the entirety of the microlens arrays can be changed. For two (thin) lenses, for example, an effective focal length $f_E$ can be determined from the focal lengths of the individual lenses $f_1$, $f_2$ and the distance ds of the lenses according to the basic relationship $$\frac{1}{f_E} = \frac{1}{f_1} + \frac{1}{f_2} - \frac{ds}{f_1 * f_2}$$

From this basic relationship, the effective focal length $f_{ML}$ of an arbitrary entirety of microlens arrays (in the scope of the disclosure usually comprising three or four microlens arrays) in the beam path can be determined (if necessary iteratively).

In a respective microlens array, the focal length of the individual lenses is uniform. The optical distance is determined as the path length along the beam path.

In the simplest case, a respective microlens array in the beam path is implemented by a separate microlens array component. However, it is also possible that multiple microlens arrays in the beam path are implemented by a single microlens array component, in that the beam path correspondingly passes through this microlens array component multiple times.

The aperture (also called pitch) a is the width of a respective microlens in a direction transverse to the beam propagation direction, i.e., transverse to the (local) beam path.

The optical assembly can also comprise a laser source in addition, which provides the essentially collimated laser beam having the center wavelength λ, which passes through the beam path. The greater the divergence of the laser beam, the larger the spots in the multi-focus profile also become. The laser beam is at least supposed to be collimated enough that the spots remain separate in the focal plane of the Fourier lens assembly; for this purpose, the divergence Θ of the laser beam is typically selected with Θ<λ/(π*a) or preferably Θ<λ/(2*a).

An embodiment of the optical assembly is preferred in which the following applies at each of the adjustment positions i:

$$\frac{a^2}{\lambda \cdot f_{ML,i}} - N_i \leq 0.2,$$

preferably ≤0.1, particularly preferably ≤0.05. The more precisely the term $a^2/(\lambda * f_{ML,i})$ results in a whole number, the more uniform the intensity distribution typically is at the foci of the multi-focus profile. Depending on the application, the requirement for the intensity distribution can vary, for example with regard to thermal transport in a melt pool in the case of a laser welding process. Below 0.2 deviation from the whole number, a good uniform distribution of the intensity can usually already be achieved, which is sufficient for typical applications such as planar welding.

An embodiment is also preferred in which the beam path passes through at least three, preferably at least four microlens arrays. With three or four microlens arrays, on the one hand, still a simple and compact structure is achievable with, on the other hand, a quite flexibly settable number of the foci can already be achieved. It is to be noted that an optical assembly can also already be constructed with two microlens arrays in the specific case.

In one particularly preferred embodiment, it is provided that the optical assembly comprises at least one deflection optical unit, in particular a retroreflector or a mirror, and that the beam path passes through at least one microlens array component multiple times. The optical assembly can thus be constructed particularly compactly and made inexpensive. Due to the multiple passes through the microlens array component, it can accordingly be used multiple times in the beam path whereby microlens array components can be saved.

An embodiment is preferred in which the adjustment mechanism comprises a slide, on which at least two microlens array components are arranged at a fixed distance, and that the slide is movable in relation to at least one further microlens array component, preferably at least two microlens array components, along the beam propagation direction. Due to the arrangement of two microlens array components on a shared slide, the degrees of freedom of the optical assembly can be intentionally restricted or predetermined, in order to be able to set the effective focal length $f_{ML}$ more easily.

In one preferred refinement of this embodiment, it is provided that a first and third microlens array in the beam path are fixed in place and a second and fourth microlens array in the beam path are arranged on the movable slide or vice versa, and that for a focal length $f_1$ of the first and fourth microlens array and a focal length $f_2$ of the second and third microlens array, the following applies: $f_2=f_1/3$. In this case, d and t change linearly with 1/$f_{ML}$, and thus linearly with the number of the spots (foci), but the sum d+t remains constant with 1/$f_{ML}$, wherein d: distance between first and second microlens array and between third and fourth microlens array, and t: distance between second and third microlens array. A linear relationship between the number of the spots (foci) and the slide position then exists over a certain adjustment range of the slide, whereby the number of the foci may be set particularly conveniently. It is to be noted that with other ratios of $f_1$ and $f_2$, the number of foci may still be set via the slide position, but the relationship is nonlinear, so that in general a characteristic curve is used.

An embodiment is particularly preferred which provides that the optical assembly furthermore includes a wavelength-dispersive element, in particular a grating, which is arranged in the beam path before the entirety of the microlens arrays and is suitable for spectrally widening the at least essentially collimated laser beam in a direction transverse to the beam propagation direction, and that the Fourier lens assembly is formed having a focal length variable in the direction transverse to the beam propagation direction. In this embodiment, the optical assembly can also focus laser light having noticeably different wavelength components (as occur, for example, with ultrashort laser pulses) exactly in one multi-focus profile. It is designed so that wavelength-related differences of the focus distances (as would occur with a uniform Fourier lens focal length) are just compensated for by the different Fourier lens focal length along the direction transverse to the beam propagation direction (along which the different wavelength components of the laser light are also split). The foci (above all the outer ones) are then not spectrally blurred, but rather remain sharp. The curve of the focal length is preferably proportional to the spectral curve. In particular, a focal length variable linearly with the direction transverse to the beam propagation direction can be applied; an optical grating can be used for this purpose.

One advantageous further development of this embodiment provides that the Fourier lens assembly is designed as a free-form lens having a lens curvature variable in the direction transverse to the beam propagation direction. This enables a comparatively simple structure of the optical assembly. If desired, a combination of multiple asphers or free-form lenses can also be used for the Fourier lens assembly.

An embodiment is also advantageous in which the adjustment mechanism is motorized and includes an electronic control device, wherein the various adjustment positions i are programmed into the electronic control device and are automatically accessible by means of the electronic control device. A convenient and rapid switching between different numbers of foci is thus possible, when a next processing task is imminent.

Furthermore, an embodiment is advantageous in which the optical assembly furthermore comprises a phase shifter, using which, for the laser light, a phase offset of $n*\pi$, where n is an odd natural number, can be generated between the beam bundles of adjacent microlenses of the microlens arrays. Using the phase shifter, it is possible to also generate an even number of foci. If an even number $N_i$ is essentially smoothly set by the term $$\frac{a^2}{\lambda \cdot f_{ML,i}},$$

nonetheless an odd number ($N_i+1$) of foci is thus obtained, since the zeroth order occurs in addition. A destructive interference is achieved by the phase shifter, by which interference the zeroth order is eliminated. The phase offset is typically $\pi$.

In one preferred further development of this embodiment, it is provided that the phase shifter is designed as a phase shifter element in which alternately first passing elements and second passing elements are formed in the direction transverse to the beam propagation direction, wherein the passing of a first passing element generates the phase offset of $n*\pi$ in relation to the passing of a second passing element for the laser light, in particular wherein the first passing elements and second passing elements each have a width corresponding to the aperture a. This design is relatively simple and also enables simple switching between odd and even numbers of foci, in that the phase shifter element is put into the beam path or taken out of the beam path as needed. The first passing elements can be "empty", for example, and the second passing elements can contain a material, the thickness of which is set so that upon the passing of the (at least essentially) collimated laser light, the desired phase shift results.

In another advantageous further development, it is provided that the phase shifter is integrated into one of the microlens arrays, in particular wherein the profiling of the microlens array at the transition of two adjacent microlenses provides a thickness jump in each case, which generates the phase offset of $n*\pi$ for the laser light. In this design, a separate phase shifter element can be saved. For example, the thickness of the microlens array changes gradually over the width of a microlens aperture, so that a phase offset of $n*\pi$ is built up over the width of the microlens aperture; this thickness change is overlaid with the actual lens profile. It is also possible to form every second microlens having a uniform additional thickness.

An embodiment is advantageous in which the optical assembly furthermore comprises a beam-forming lens, which is arranged in the beam path before the microlens arrays, in particular wherein a focal length $f_{SL}$ of the beam-forming lens is selected where $$\frac{1}{f_{SL}} = \frac{\lambda}{a^2}.$$

The essentially collimated laser beam can be formed using the beam-forming lens, in particular its divergence can be changed. The beam-forming lens can in particular focus the collimated laser beam, wherein at least one microlens array is arranged behind the beam-forming lens in the beam path. The interference condition can be manipulated by the beam-forming in such a way that an even number of foci is set; this can be achieved by maintaining the condition $$\frac{1}{f_{SL}} = \frac{\lambda}{a^2}.$$

In particular, the zeroth order of diffraction can be eliminated.

An embodiment is also advantageous which provides that furthermore a lateral offset $\Delta$ of at least one of the microlens arrays in relation to at least one of the other microlens arrays with respect to at least one direction transverse to the beam propagation direction is settable using the adjustment mechanism, in particular wherein the adjustment mechanism has multiple lateral adjustment positions $j=1, \ldots, L$, where j: index of the lateral adjustment positions and L: a natural number $\geq 2$, at which the following applies $$\Delta_j = \frac{a}{2*j}$$

where $\Delta_j$: lateral offset at the lateral adjustment position j. It is possible by way of a lateral offset (for example measured between the center axes of two microlenses at a position corresponding to one another in the microlens arrays compared to one another), to manipulate the interference condition with simultaneously suitable setting of the distances of the microlens arrays in such a way that an even number of foci is set. In particular, the zeroth order of diffraction can be deleted. Moreover, under specific conditions the position of the foci can be laterally offset via the lateral offset.

An embodiment is also advantageous in which at least two of the microlens arrays in the beam path have a different focal length. The optical assembly can thus be designed more freely. In particular, with this design, three microlens arrays can be used in the beam path, for example having a sequence long focal length—short focal length—long focal length. Alternatively, it is also possible to provide an equal focal length for all microlens arrays, for example in the case of four or more microlens arrays in the beam path.

An embodiment is also preferred in which the optical assembly is designed to generate a two-dimensionally focused multi-focus profile, wherein the microlenses of the microlens arrays are arrayed in two linearly independent directions perpendicular to the beam propagation direction, in particular wherein the apertures a and the effective focal lengths $f_{ML,i}$ are identical in both linearly independent directions. It is thus possible to generate a two-dimensional focus grid, using which, for example, planar welding processes can be carried out faster. If the apertures a and the effective focal lengths $f_{ML,i}$ are selected to be equal in both directions (in particular wherein the focal lengths of the respectively relevant microlens arrays are equal for both directions and are arranged at least approximately at the same locations in the beam path), an equal number of foci $N_i$ and a uniform intensity distribution are thus obtained at the adjustment positions i in both directions (due to "smooth" setting of the natural number $N_i$ in the same way). However, it is alternatively also possible to select the apertures a and/or the effective focal lengths $f_{ML,i}$ to be different in both directions (in particular wherein the focal lengths of the respectively relevant microlens arrays are different in the two directions), for example in order to set a different number of foci in both directions and/or to obtain different distances of the foci in both directions; however, it is to be noted that in each case an essentially smooth number $N_i$ of the term $$\frac{a^2}{\lambda \cdot f_{ML,i}}$$

also then has to be achieved at the adjustment positions i for both directions, in order to obtain a uniform illumination of the foci. The two linearly independent directions are typically perpendicular to one another, however it is also possible to select another mutual alignment, for example a 60° angle for a hexagonal focus grid.

A method for operating an above-described optical assembly also falls within the scope of the present disclosure, which is characterized in that different adjustment positions i are accessed in chronological succession using the adjustment mechanism, in which positions different multi-focus profiles are generated using the laser beam, which have a different number $N_i$ of foci in one direction in which the microlenses of the microlens arrays are arrayed. The optical assembly is thus used flexibly, namely having different number of foci with respect to different processing tasks for the laser radiation, and the effort for changing the number of foci is low. In particular, exchange components are not required for the change.

A variant of the method is preferred which provides that an adjustment position i is also accessed using the adjustment mechanism, for which position $N_i$ is an odd number. During the generation of the multi-focus lens profile in this adjustment position i, a phase shifter is not arranged in the beam path. This is particularly simple.

A variant is particularly preferred, in which an adjustment position i is also accessed using the adjustment mechanism, for which position $N_i$ is an even number, wherein during the generation of the multi-focus profile in this adjustment position i, a phase shifter is arranged in the beam path, using which phase shifter a phase offset of n*π, where n is an odd natural number, is generated between the beam bundles of adjacent microlenses of the microlens arrays. By using the phase shifter, it is achieved that the number of the foci also corresponds to $N_i$, in that the zeroth order of diffraction is eliminated. It is to be noted that the phase shifter can be integrated into one of the microlens arrays or can be a separate phase shifter element. The phase offset is typically π.

In one preferred variant, it is provided that an adjustment position i is also accessed using the adjustment mechanism, for which position $N_i$ is an even number, wherein a beam-forming lens is arranged in the beam path before the microlens arrays, in particular wherein a focal length $f_{SL}$ of the beam-forming lens is selected where $$\frac{1}{f_{SL}} = \frac{\lambda}{a^2}.$$

Due to the setting of a suitable divergence by means of the beamforming lens, the interference condition can be manipulated in such a way that an even number of foci is set; this can be achieved in a simple manner by maintaining the condition $$\frac{1}{f_{SL}} = \frac{\lambda}{a^2}.$$

A variant is also advantageous in which an adjustment position i is also accessed using the adjustment mechanism, for which position $N_i$ is an even number, wherein a lateral adjustment position having a lateral offset Δ, where Δ≠0, of at least one of the microlens arrays in relation to at least one other of the microlens arrays with respect to at least one direction transverse to the beam propagation direction is herein set using the adjustment mechanism, in particular wherein only two microlens arrays (MLA1, MLA2) are arranged in the beam path at an optical distance d, where $$\Delta = \frac{a}{2*N_i} \text{ and } d = \frac{a^2}{(N_i - 1)*\lambda}.$$

It is to be noted that furthermore $$N_i = \frac{a^2}{f_{ML,i}*\lambda}.$$

Due to the lateral offset, it is possible with simultaneously suitable setting of the optical distances of the microlens arrays, to manipulate the interference condition in such a way that an even number of foci is set. This can take place particularly simply in an optical assembly having only two microlens arrays in the beam path in the case of the above-specified conditions.

Furthermore, a variant is advantageous which provides that to generate the multi-focus line profiles, a pulsed, at least essentially collimated laser beam having ultrashort laser pulses is used, in particular having a duration of 500 fs or shorter, preferably 100 fs or shorter, that a wavelength-dispersive element is arranged in the beam path before the entirety of the microlens arrays, which element spectrally expands the at least essentially collimated laser beam in a direction transverse to the beam propagation direction, and that a Fourier lens assembly having a focal length variable in the direction transverse to the beam propagation direction is used in the beam path behind the entirety of the microlens arrays. If ultrashort laser pulses are used, the spectrum (the wavelength) of the laser light can expand. The expansion of the spectrum of the laser light can in turn result in spatial blurring of foci located on the outside, above all if the numeric aperture of the optical assembly is large (or a large number of foci is to be generated). By using the wavelength-dispersive element and the Fourier lens assembly having variable focal length, the spatial blurring of the outer foci can be suppressed. It is to be noted that the wavelength-dispersive element and the Fourier lens assembly having variable focal length can be used in principle in all types of laser beams from cw (continuous wave) to fs (femtoseconds), and can compensate for spatial blurring due to different wavelength components independently of their cause.

The use of an above-described optical assembly or of an above-described method for additive manufacturing of objects also falls within the scope of the present disclosure, wherein a layer of powdered material is flatly melted or flatly sintered using at least one multi-focus profile, in particular a multi-focus line profile. A number of foci for flatly melting or sintering a surface can be selected flexibly, and in particular can be adapted quickly via the number of the foci to a width of the surface to be processed. Objects can thus be additively manufactured particularly quickly and precisely. It is to be noted that the foci always have the same distance independently of their number. The number of the foci can be changed within a layer to be manufactured and/or from one layer to a next and/or from one object to the next by changing the adjustment position using the adjustment mechanism.

FIG. 1 shows an embodiment of an optical assembly 1.

The optical assembly 1 has a laser source 2, the end of an optical fiber here, from which a single mode laser beam 3 exits. The laser beam 3 is collimated at least with respect to one direction x perpendicular to a beam propagation direction z and passes through a beam path 4 along the z direction in the optical assembly 1.

In the beam path 4, the laser beam 3 passes four microlens arrays MLA1-MLA4 here. Each microlens array MLA1-MLA4 has microlenses 5 arrayed in the x direction having an aperture a; the aperture a measured along the x direction is equal for all microlens arrays MLA1-MLA4. The microlens arrays MLA1-MLA4 or their microlenses 5 can all have different focal lengths $f_1$-$f_4$; within a respective microlens array MLA1-MLA4, the focal length f1-f4 of the microlenses 5 is uniform (with respect to the curvature along the x direction).

A mirror can optionally be arranged here between the microlens arrays MLA2 and MLA3 (cf. FIG. 4 below).

Each point of a respective microlens (cf. aperture a) in the plane of the first microlens array MLA1 is imaged into an angle by the microlens arrays MLA1-MLA4, i.e., an angle spectrum is generated. This angle spectrum is imaged into a focal plane 7 using a Fourier lens assembly 6.

Figure 2:
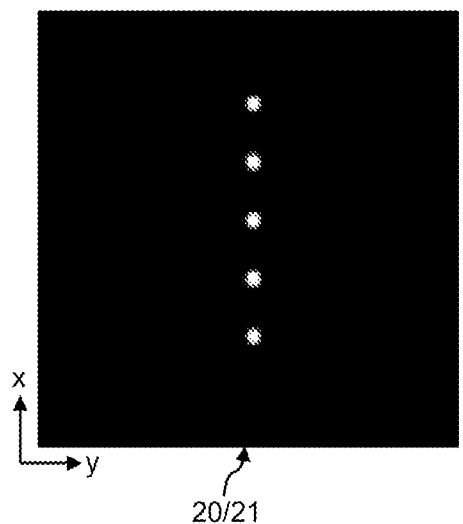
FIG. 2 shows a multi-focus line profile, which can be generated using an optical assembly.
Figure 3:
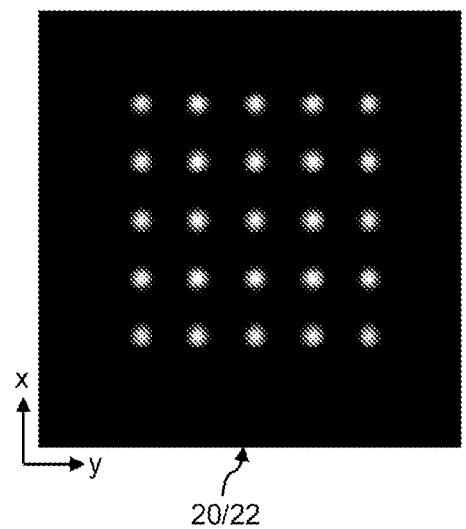
FIG. 3 shows a two-dimensional multi-focus profile, which can be generated using an optical assembly.

A multi-focus profile results in the focal plane 7 (cf. FIG. 2 and FIG. 3).

An effective focal length $f_{ML}$ of the entirety 8 of the microlens array MLA1-MLA4 results from the focal lengths $f_1$-$f_4$ of the microlens arrays MLA1-MLA4 and the relative positions of the microlens arrays MLA1-MLA4 along the beam path 4 or along the z direction. The entirety of the microlens arrays MLA1-MLA4 is also referred to as an imaging homogenizer.

The optical assembly 1 has an adjustment mechanism 15, using which at least some of the mutual distances of the microlens arrays MLA1-MLA4 can be adjusted. For example, as shown in FIG. 1, a separate slide 11-14 (for example having a driven gearwheel engaging in a toothed rack) movable by a motor on a guide 9 (such as the toothed rack) can be provided for each microlens array MLA1-MLA4, wherein the slides can be actuated via an electronic control device 10. Multiple adjustment positions for the entirety 8 of the microlens arrays MLA1-MLA4 are stored in the control device 10, wherein a respective adjustment position comprises target positions to be accessed with respect to the z direction for the slides 11-14. It is to be noted that in other designs the positions of some microlens arrays MLA1-MLA4 can be coupled and/or fixed in place (see also FIG. 4, FIG. 5).

By changing the adjustment position, the effective focal length $f_{ML}$ of the entirety 8 of the microlens arrays MLA1-MLA4 can be changed. The effective focal length $f_{ML}$ of the entirety 8 of the microlens arrays ML1-ML4 corresponds to a focal length f* of a classical homogenizer having identical imaging properties (remark: a classical homogenizer has two microlens arrays of equal focal length f*, which are arranged at a distance of their focal length f* in relation to one another).

In the scope of the disclosure, the adjustment mechanism 15 can set multiple adjustment positions i=1, . . . , M, for each of which the term $$\frac{a^2}{\lambda \cdot f_{ML,i}}$$

essentially smoothly (i.e. with no or only minor remainder) results in a natural number $N_i$, where $f_{ML,i}$ is the effective focal length in the adjustment position i. The different adjustment positions i typically result in different natural numbers $N_i$ having an error of less than 0.2, preferably less than 0.1, particularly preferably less than 0.05. An essentially uniformly illuminated microfocus profile then results in the focal plane 7.

It is to be noted that, while omitting the Fourier lens assembly 6, a uniformly illuminated angle spectrum could also be obtained using the optical assembly 1; such a modified assembly could be used as an efficient beam splitter.

FIG. 2 shows a microfocus profile 20, here microfocus line profile 21, generated using an optical assembly as shown in FIG. 1. Five foci are generated one over another on a line here in the x direction; the associated adjustment position i accordingly has $N_i$=5. The microlens arrays only have microlenses arrayed in the x direction in this case, but not in the y direction. In the y direction, the laser beam has been focused in the focal plane, for example using a cylinder lens between the laser source and the first microlens array in the beam path (not shown in greater detail in FIG. 1).

If the microlens arrays of the optical assembly also have microlenses arrayed in the y direction, for example by a corresponding grinding with respect to both directions x, y, a two-dimensional microfocus profile 22 can also be generated using the optical assembly, cf. FIG. 3. Five by five foci are generated here one over another in the x direction and adjacent to one another in the y direction, which are arranged in a square grid here.

Figure 4:
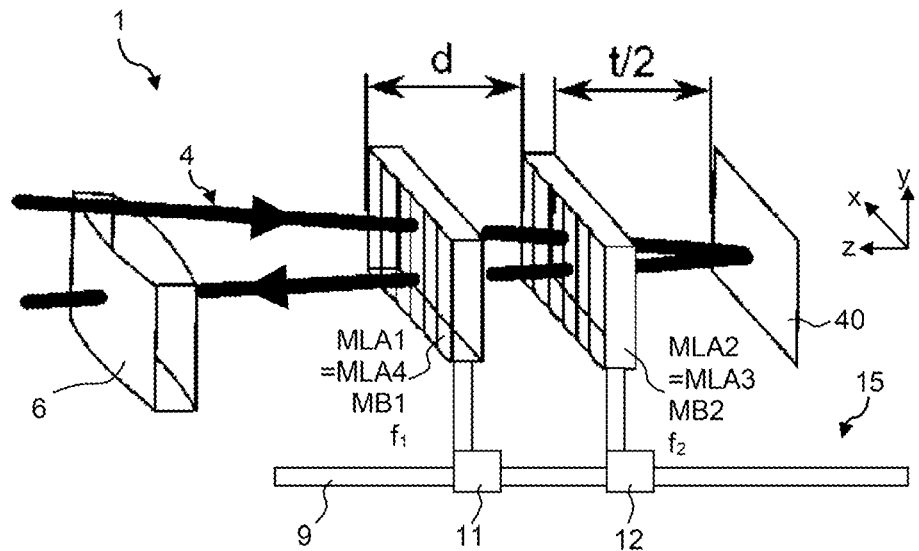
FIG. 4 shows a first alternative design to the optical assembly of FIG. 1, having a mirror and two microlens array components.

FIG. 4 shows a partial detail of an optical assembly 1, the beam path 4 of which corresponds to the optical assembly of FIG. 1, in a special design. Above all the differences from FIG. 1 are explained.

In this design, the microlens arrays MLA1 and MLA4 are implemented by a single microlens array component MB1 having focal length $f_1$, and the microlens arrays MLA2 and MLA3 are implemented by a single microlens array component MB2 having focal length $f_2$. The beam path 4 first goes through the microlens array components MB1 and MB2, is then reflected on a mirror 40, and then goes once again through the microlens array components MB2 and MB1; the beam path 4 subsequently reaches the Fourier lens assembly 6. The optical assembly 1 can thus manage using only two microlens array components MB1, MB2.

The adjustment mechanism 15 can be designed, for example, having slides 11, 12 movable on the guide 9 for the microlens array components MB1 and MB2, which are actuated by the electronic control device (not shown here).

In this design, only the distance d between the microlens arrays MLA1 and MLA2, which is equal to the distance d between the microlens arrays MLA3 and MLA4, and the distance t between the microlens arrays MLA2 and MLA3 can be adjusted. In this case, d and t can be adjusted independently of one another.

For a desired effective focal length $f_{ML}$, the distances d and t to be set at given focal length $f_1$ of the microlens arrays MLA1 and MLA4 and also given focal length $f_2$ of the microlens arrays MLA2 and MLA3 can be obtained as follows:

$$d = \frac{f_{ML}f_1 + f_{ML}f_2 + f_1 f_2}{f_1 + f_{ML}} \quad \text{(Equation 1)}$$

and $$t = f_2 \frac{f_1^2 f_2 - f_{ML}^2 f_2 + 2 f_{ML} f_1^2}{f_{ML} f_1^2} \quad \text{(Equation 2)}$$

The desired or required focal length $f_{ML}$, in order to obtain a desired number of foci N, results from $$f_{ML} = \frac{a^2}{\lambda N}. \quad \text{(Equation 3)}$$

Figure 5:
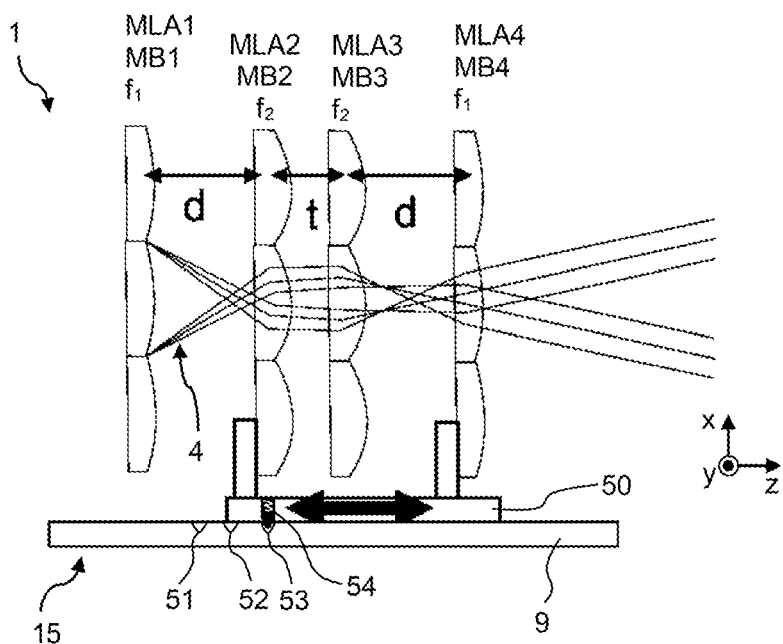
FIG. 5 shows a second alternative design to the optical assembly of FIG. 1, having four microlens array components and a shared slide for two of the microlens array components.

FIG. 5 shows a partial detail of an optical assembly 1, the beam path 4 of which corresponds to the optical assembly of FIG. 1, in a further special design. Above all the differences from FIG. 1 are again explained.

In this design, the beam path 4 goes in succession through four microlens array components MB1-MB4, which each provide one microlens array MLA1-MLA4 for the beam path 4. The microlens arrays MLA1 and MLA4 each have the focal length f1, and the microlens arrays MLA2 and MLA3 each have the focal length f2. The microlens array components MB1 and MB3 are arranged fixed in place here, and the microlens array components MB2 and MB4 are arranged on a shared slide 50 at a fixed distance (of d+t here). The shared slide 50 is movable by motor using an electronic control device (not shown) on a guide 9, which extends in the beam propagation direction z, whereby the adjustment mechanism 15 is formed.

Various adjustment positions of the shared slide 50 can be predetermined using detent recesses 51, 52, 53, at which a spring-loaded detent element 54 of the slide 50 can engage to make the respective adjustment position easy to find and able to be maintained well.

In this design, the above-explained equations 1 to 3 for determining d, t, and $f_{ML}$ also apply.

Figure 6:
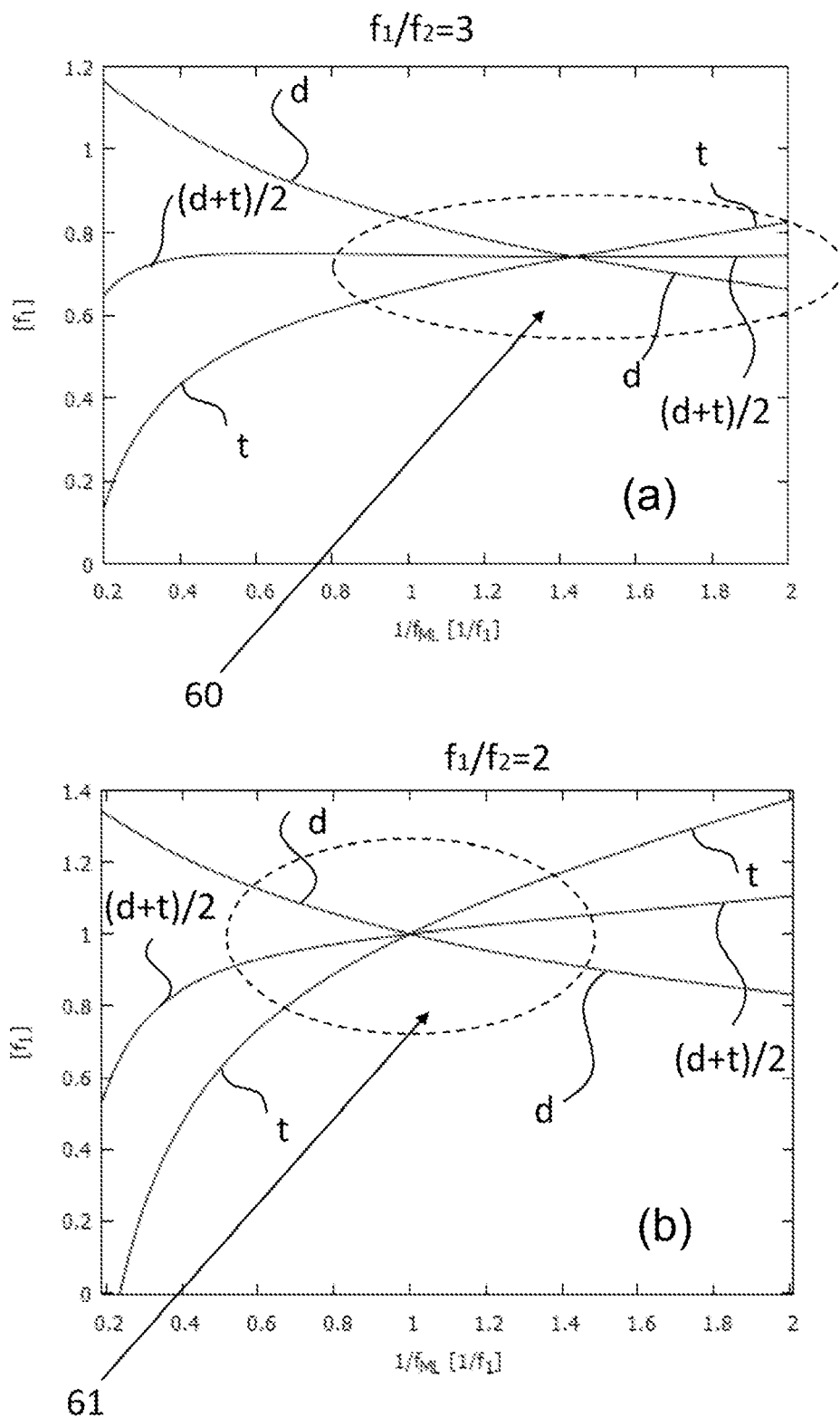
FIG. 6 shows a diagram on the dependence of d, t, and fML for the design of FIG. 5, in the case of partial figure (a) where f2=f1/3, and in the case of partial figure (b) where f2≠f1/3.

By moving the shared slide 50 in the z direction, d and t can be changed, wherein the sum d+t remains equal, however. If $f_2 = f_1/3$ is now selected, using this one degree of freedom of the adjustment mechanism 15, the number of the foci N can be linearly tuned or adjusted in a broad range 60, because in this case d and t scale here approximately linearly in an equal but opposite manner with $1/f_{ML}$, so that the sum of d and t as a function of $1/f_{ML}$ remains approximately constant, cf. FIG. 6, partial figure (a). In this figure, d, t, and (d+t)/2 are plotted upward (in units of $f_1$), each as a function of the variable $1/f_{ML}$ (in units of $1/f_1$), which is plotted to the right. In the range 60 of the partial figure (a) approximately between $1/f_{ML}$ from $0.8/f_1$ to $2.0/f_1$, said linear dependence is provided. If $f_2 = f_1/2$ is selected, i.e., $f_2 \neq f_1/3$, as shown in partial figure (b) of FIG. 6, (d+t)/2 and thus the sum d+t change as a function of $1/f_{ML}$, which results in a nonlinear dependence of the number of the foci N as a function of the adjustment position of the slide, cf. range 61; the adjustment of the number of the foci is then also possible, but is less intuitive.

Figure 7:
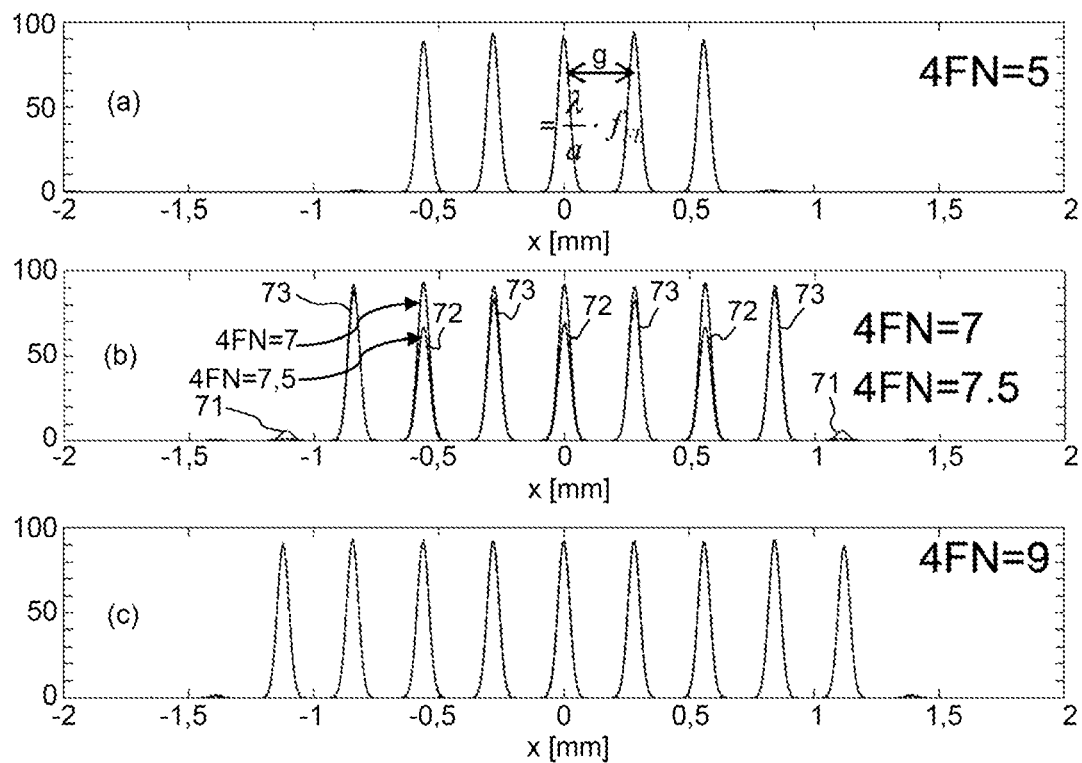
FIG. 7 shows diagrams of the intensity distribution in the focal plane of the Fourier lens assembly of an optical assembly for variously set values of 4FN, namely 4FN=5 (a top), 4FN=7 and 7.5 (b middle), 4FN=9 (c bottom)

FIG. 7 illustrates the intensity distribution on the foci of a multi-focus profile as a function of the size of the term $$\frac{a^2}{\lambda \cdot f_{ML,i}} = 4FN,$$

where FN: Fresnel number. The position in the x direction is plotted in each case to the right, an intensity of the laser radiation in the focal plane is plotted upward (in arbitrary units).

If 4FN is selected as precisely $N_i=5$ (in that an effective focal length $f_{ML,1}$ suitable for the wavelength λ of the laser source and the aperture/pitch a of the microlens arrays is set at the adjustment position i), five peaks having nearly equal intensity thus result, cf. top diagram (a). This applies accordingly for a selection 4FN=9, wherein nine peaks of approximately equal intensity result, cf. bottom diagram (c). In middle diagram (b), the intensity curves for 4FN=7 and 4FN=7.5 are shown. For 4FN=7 seven peaks of approximately equal intensity again result. For 4FN=7.5, however, nine peaks are obtained: The two outer peaks 71 have a slight but noticeable intensity. The third, fifth, and seventh peak, each marked with reference sign 72, have a moderate intensity. However, this is significantly less than the intensity of the second, fourth, sixth, and eighth peak, each marked with reference sign 73.

The more precisely the value 4FN, i.e. the term $$\frac{a^2}{\lambda \cdot f_{ML,i}},$$

matches the desired peak number $N_i$, the more uniform is the distribution of the intensity over the generated peaks.

It is to be noted that the distance g of the foci in the three adjustment positions for $N_i=5$, 7, and 9 is equal everywhere, since the distance g is only dependent on the wavelength λ of the laser radiation, the aperture (pitch) a of the microlenses, and the focal length $f_{FL}$ of the Fourier lens assembly, but not on the effective focal length $f_{ML,i}$ of the homogenizer.

Figure 8:
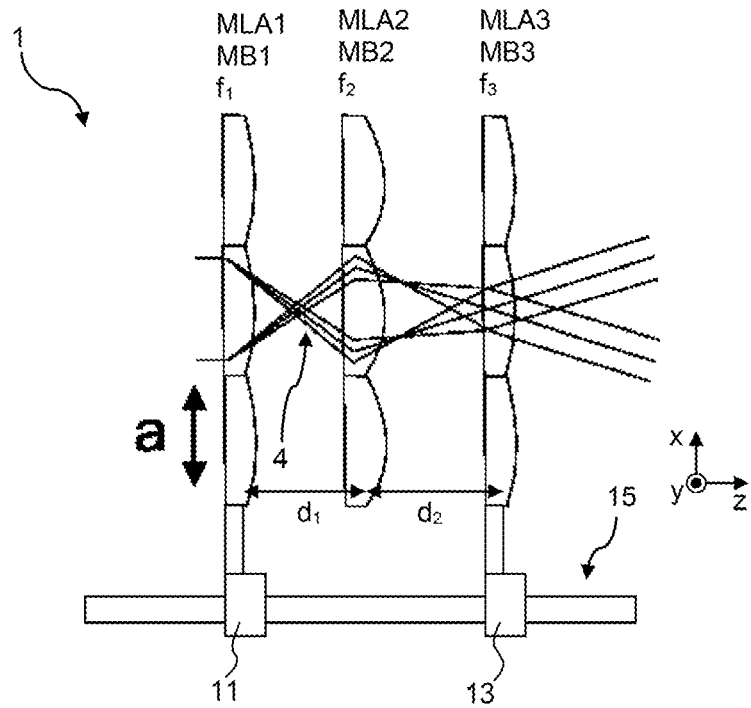
FIG. 8 shows a further embodiment of an optical assembly in a partial detail, having three microlens arrays in the beam path.

FIG. 8 shows a partial detail of a further embodiment of an optical assembly 1. In this embodiment, the beam path 4 passes three microlens arrays MLA1, MLA2, MLA3 having focal lengths f1, f2, f3, which are each implemented via individual microlens array components MB1, MB2, MB3. An adjustment mechanism 15 enables here the positions of slides 11, 13, which bear the microlens array components MB1 and MB3, to be adjusted by motor via an electronic control device (not shown), and thus the distance d1 between the microlens arrays MLA1 and MLA2 and the distance d2 between the microlens arrays MLA2 and MLA3 to be set independently of one another. The microlens array component MB2 is formed fixed in place here.

For a desired effective focal length $f_{ML}$ the distances d1 and d2 to be set at given focal lengths $f_1$, $f_2$, $f_3$ can be obtained as follows:

$$d_1 = f_2\left(1 + \frac{f_{ML}}{f_3}\right) \quad \text{(Equation 4)}$$

and $$d_2 = f_2 + f_3 + \frac{f_2 f_3}{f_{ML}}. \quad \text{(Equation 5)}$$

The desired or required focal length $f_{ML}$, in order to obtain a desired number of foci N again results from $$f_{ML} = \frac{a^2}{\lambda N}. \quad \text{(Equation 3)}$$

Figure 9:
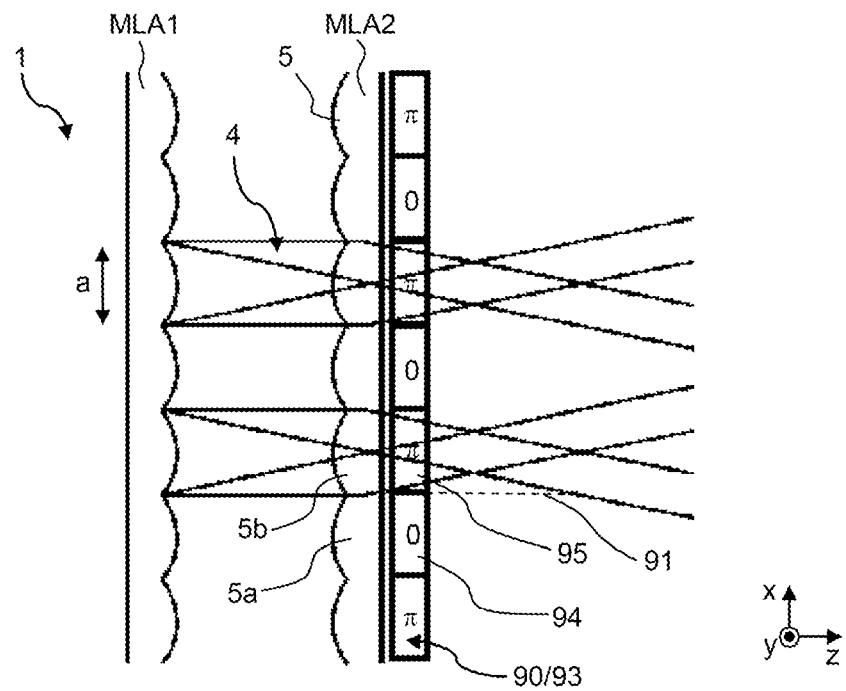
FIG. 9 shows a further embodiment of an optical assembly in a partial detail, having a phase shifter element in the beam path.

For the generation of odd numbers $N_i$ of foci, the entirety of the microlens arrays can be used directly together with the Fourier lens assembly, for example as shown in FIG. 1. For the generation of an even number of foci, a phase shifter 90 is additionally used, cf. the embodiment of an optical assembly 1 of FIG. 9 shown in a partial detail. The phase shifter 90 generates a phase jump of π, corresponding to an optical path length difference of λ/2, at the transition 91 between the beam bundles of adjacent microlenses 5a, 5b. The zeroth order of diffraction is thus eliminated, which is generated at even-numbered $N_i$ in addition to the desired $N_i$ foci by the entirety of the microlens arrays MLA1, MLA2.

In the embodiment shown in FIG. 9, a phase shifter element 93 is arranged in the beam path 4 directly behind the last microlens array MLA2, which phase shifter element, in the x direction, in which the microlenses 5, 5a, 5b are arrayed in succession, alternately forms first passing elements 94 and second passing elements 95, aligned with the microlenses 5, 5a, 5b or the associated beam bundles. The passing elements 94, 95 thus have a width in the x direction corresponding to the aperture a. The first passing elements 94 generate here a phase offset of 0 (zero) over their entire width in the x direction, and the second passing elements 95 generate here a phase offset of π over their entire width in the x direction.

The phase shifter element 93 can be removed here as needed from the beam path 4 (for example withdrawn in the −x direction) or introduced back into the beam path 4, depending on whether an odd or even number of foci is to be generated. A motor and an electronic control device can also be used for this purpose. The adjustment mechanism provided is not shown in FIG. 9 for simplification.

Figure 10:
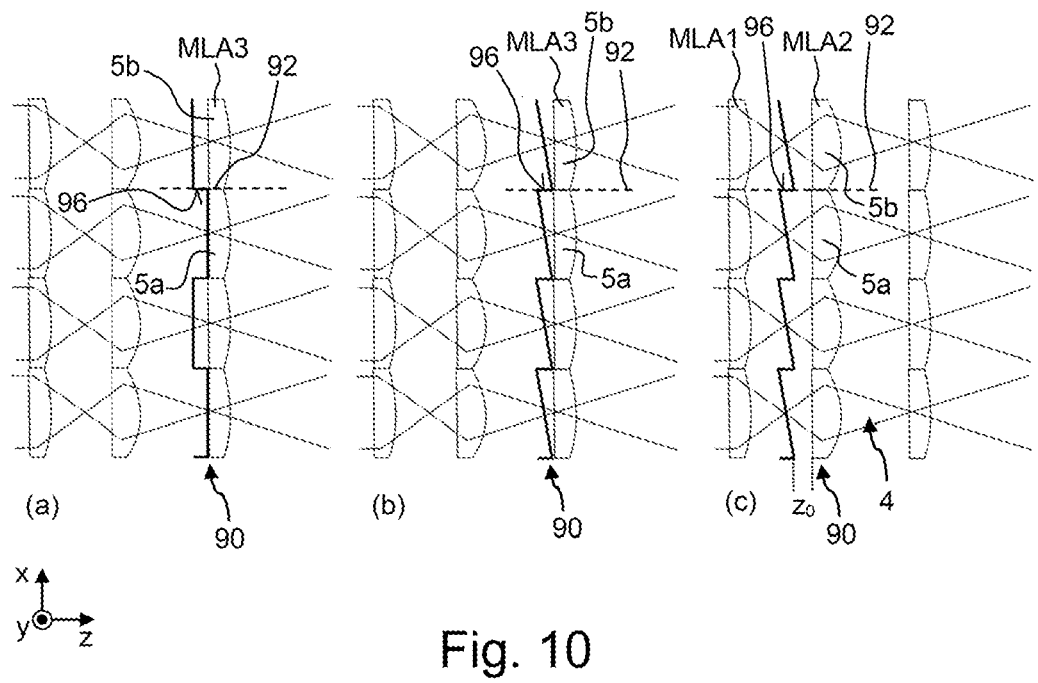
FIG. 10 shows further embodiments of an optical assembly in a partial detail, having three microlens arrays in the beam path and phase shifter integrated in a rearmost microlens array having alternately configured additional thickness (a), in a rearmost microlens array having sawtooth-type configured additional thickness (b), and in a middle microlens array having sawtooth-type configured additional thickness (c)

However, it is also possible to integrate a phase shifter 90 into a microlens array, cf. FIG. 10.

In the variant shown under (a) on the left, the microlens array MLA3 is provided here with an integrated phase shifter 90. At the transition 92 of the adjacent microlenses 5a, 5b, a thickness jump 96 takes place here, which generates the phase offset of π. The additional thickness of the microlens array provided by the integrated phase shifter 90 is maintained uniformly over the entire width of a respective microlens 5b, and in the alternating microlenses 5a, this additional thickness is absent.

In the variant shown under (b) in the middle, wherein the phase shifter 90 is again integrated into the microlens array MLA3, a thickness jump 96 also takes place at the transition 92 of adjacent microlenses 5a, 5b. However, the additional thickness of a respective microlens 5a, 5b changes along the x direction, increasing linearly here from 0 (zero) additional thickness up to an additional thickness corresponding to the phase difference π over the width of the microlens 5a, 5b. This sawtooth profiling is provided in all microlenses 5a, 5b.

In the variant shown under (c) on the right, the phase shifter 90 is integrated into the middle microlens array MLA2. A thickness jump 96 is also provided here at the transition 92 between adjacent microlenses 5a, 5b. The additional thickness of a respective microlens 5a, 5b along the x direction increases linearly here from a starting value z0 of additional thickness up to an additional thickness corresponding to z0 plus the thickness corresponding to the phase difference π over the width of the microlens 5a, 5b. The starting value z0 is used to bring the location of the phase jump with respect to the x direction approximately to the focal plane of the microlens arrays MLA1. The sawtooth profiling is again provided in all microlenses 5a, 5b.

In general, the phase shifter 90 is preferably located approximately in the focal plane of a respective microlens array (or a respective sub-aperture), or else directly behind the last microlens array in the beam path 4.

It is again to be noted that, in FIG. 10, the adjustment mechanisms provided are not shown for simplification.

Figure 11:
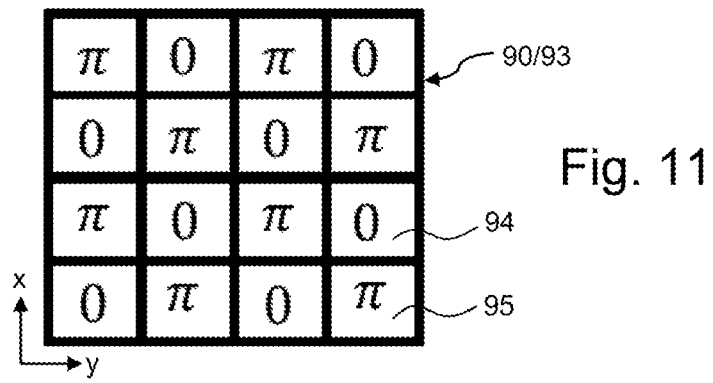
FIG. 11 shows a phase shifter element in a top view for an optical assembly for generating a two-dimensional multi-focus profile.

It is to be noted that in optical assemblies, which are designed for generating a two-dimensional multi-focus profile and accordingly have microlenses arrayed in two linearly independent directions, for example x and y in FIG. 1, perpendicular to the beam propagation direction, cf. z in FIG. 1, in microlens arrays, to generate even numbers of foci, phase shifters 90 acting in these two directions x, y have to be used, cf. FIG. 11. The phase shifter 90 shown in FIG. 11, designed as a phase shifter element 93, has alternating first and second passing elements 94, 95 in the two directions x, y.

Figure 12:
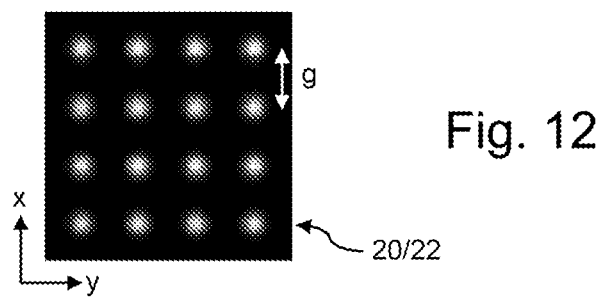
FIG. 12 shows a two-dimensional multi-focus line profile, which can be generated using an optical assembly having a phase shifter.

FIG. 12 shows a two-dimensional multi-focus profile 22, which has four foci in each case in the x direction and y direction, so that a 4×4 grid of foci is generated. A phase shifter as shown in FIG. 11 can be used for this purpose. It is to be noted that the distances g of the foci result from $$g = (\pi^* f_{FL})/a \quad \text{Equation 6}$$

where $f_{FL}$: focal length of the Fourier lens assembly. The distances g are in particular fundamentally independent of the number of the arrayed microlenses in the microlens array of the relevant direction.

Figure 13:
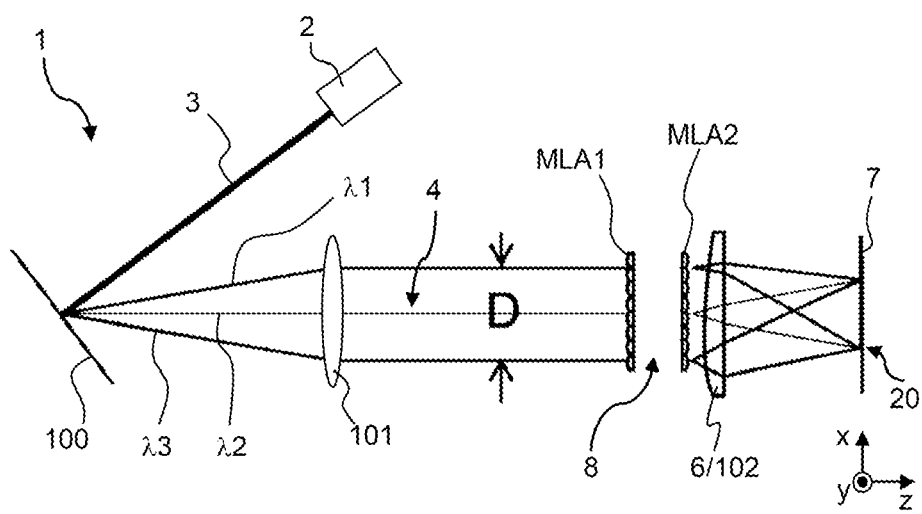
FIG. 13 shows a further embodiment of an optical assembly having a wavelength-dispersive element and Fourier lens assembly having spatially variable focal length.

FIG. 13 shows a further embodiment of an optical assembly 1. For simplification, the adjustment mechanism of the entirety 8 of the microlens arrays MLA1, MLA2 is not shown.

In this optical assembly 1, a pulsed laser source is used as the laser source 2, having pulse lengths in the order of magnitude of 100 fs. In this laser source 2, the laser beam 3 has beam components over a noticeably extended wavelength range, here from $\lambda 1$ via $\lambda 2$ to $\lambda 3$. In this case, $\lambda_1=\lambda_0-\Delta\lambda$, $\lambda_2=\lambda_0$, and $\lambda_3=\lambda_0+\Delta\lambda$. In this case, $2\Delta\lambda$ is the spectral width and $\lambda_0$ is the center wavelength of the laser pulse.

As is apparent from equation 6, the distance g of the foci in the focal plane 7 or in the multi-focus profile is dependent on the wavelength $\lambda$ of the laser radiation. In the case of laser radiation having a noticeable wavelength distribution, the foci therefore threaten to be spectrally blurred in the direction x, in which the microlenses of the microlens arrays MLA1, MLA2 are arrayed, in particular if a large number of foci is to be generated or the numeric aperture of the entirety 8 of the microlens arrays MLA1-MLA2 is correspondingly large.

Therefore, in the embodiment shown, the laser beam 3 is spectrally expanded using a wavelength-dispersive element 100, a reflection grating here, cf. beam components $\lambda 1, \lambda 2, \lambda 3$. By means of a lens 101, the beam components are then collimated with respect to (at least) the x direction and extend parallel to one another in the z direction, but are spectrally divided in the x direction over the width D. The beam components $\lambda 1, \lambda 2, \lambda 3$ are then imaged in the entirety 8 of the microlens arrays MLA1, MLA2 (cf. FIG. 1); in this case the spectral division of the beam components $\lambda 1, \lambda 2, \lambda 3$ over the x direction is essentially maintained.

In the imaging by means of the Fourier lens assembly 6, the different spectral components $\lambda 1, \lambda 2, \lambda 3$ are now taken into consideration again. According to equation 6, the distance g of the foci is also dependent on the focal length $f_{FL}$ of the Fourier lens assembly 6. Since the different spectral components $\lambda 1, \lambda 2, \lambda 3$ reach the Fourier lens assembly at different locations with respect to the x direction, the focal length of the Fourier lens assembly can be made variable in the x direction in order to compensate for the effect of the different wavelengths $\lambda 1, \lambda 2, \lambda 3$ on the distance g. In the present case, the Fourier lens assembly is correspondingly equipped as a free-form lens 102 having a local lens curvature variable in the x direction, i.e., transversely to the beam propagation direction z. A spectrally unblurred, sharp multi-focus profile 20 can thus be obtained in the focal plane 7.

Figure 14:
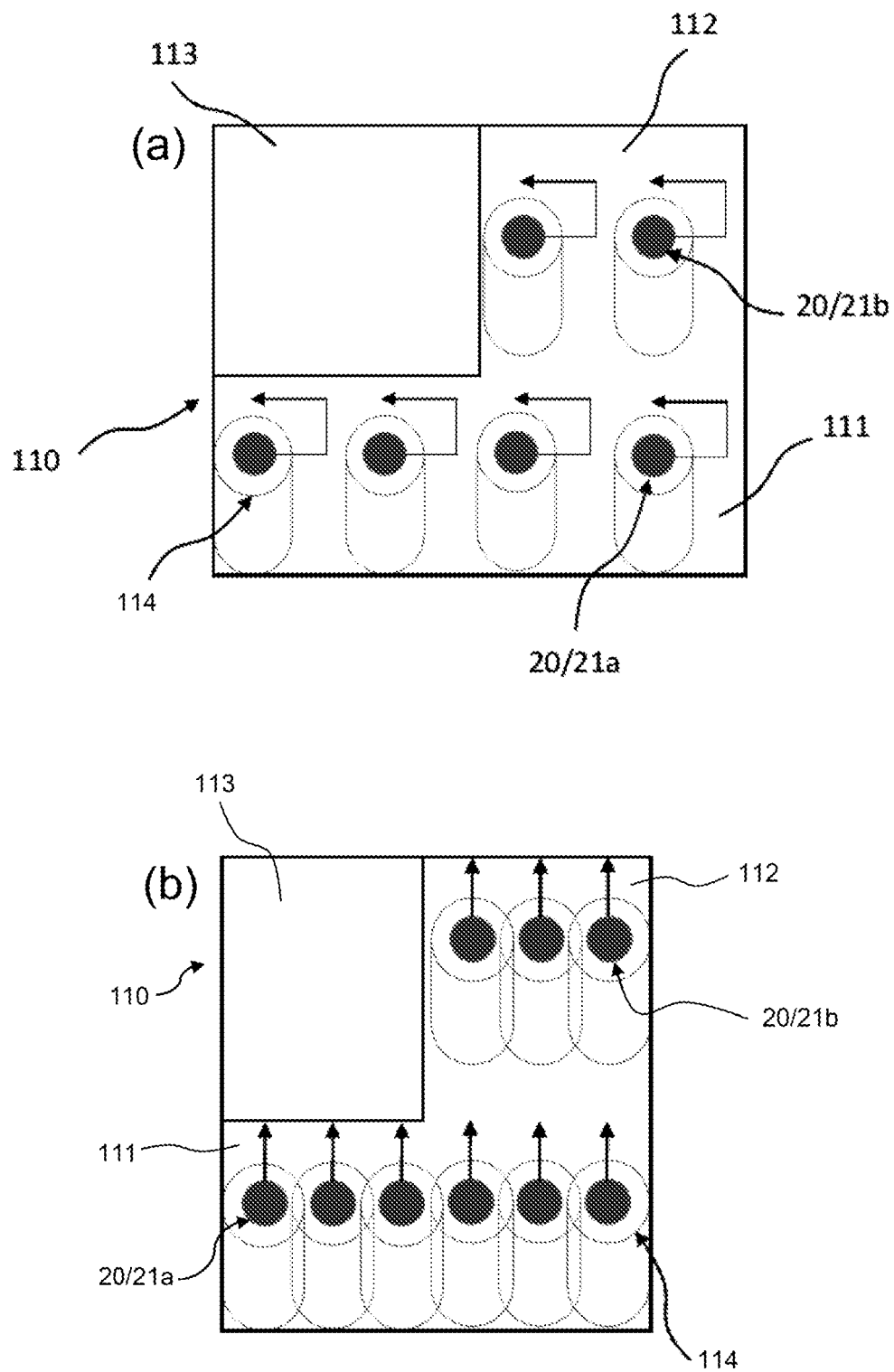
FIG. 14 shows the use of multi-focus line profiles generated during the melting of a layer of powdered material for the layer-by-layer manufacturing of a metal body, in partial figure (a) with line-by-line scanning in the case of nonoverlapping melt pools and in partial figure (b) without line-by-line scanning with overlapping melt pools.

FIG. 14 shows the use of multi-focus line profiles 20 generated in the additive manufacturing of a three-dimensional object 110, which is produced by layer-by-layer local melting of powder, such as metal powder or plastic powder. FIG. 14 shows a top view of a layer to be manufactured. This is to be consolidated in an L-shaped region, namely in the zone 111 over its entire width and in the zone 112 only over a part of its width, so that no consolidation takes place in a zone 113.

To melt the powder of the layer in the zone 111, a multi-focus line profile 21a having four foci in partial figure (a) or six foci in partial image (b) is used here. The zone 111 is scanned line-by-line using the foci in the variant of the partial figure (a); the melt pools 114 do not overlap here in the direction of their array (feed along the direction of the array within a line, feed perpendicular to the direction of the array for line change). In the variant of the partial figure (b), the melt pools 114 overlap in the direction of their array, so that the zone 111 can be processed here without line-by-line scanning (feed only perpendicular to the direction of the array). In contrast, for the melting in the zone 112, a multi-focus line profile 21b having only two foci in partial figure (a) or three foci in partial image (b) is used. The multi-focus line profile 21b is narrow enough such that the zone 113 is not melted. Switching between the multi-focus line profiles 21a, 21b is performed by changing the adjustment position of an adjustment mechanism, wherein an effective focal length $f_{ML}$ of the homogenizer is set. It is to be noted that the distances of the foci along the direction of their array in the zones 111 and 112 is equal within each partial figure (a), (b), only the number of the foci changes between the zones 111 and 112. The manufacturing of the three-dimensional object can be accelerated by the use of the multi-focus profiles.

Figure 15:
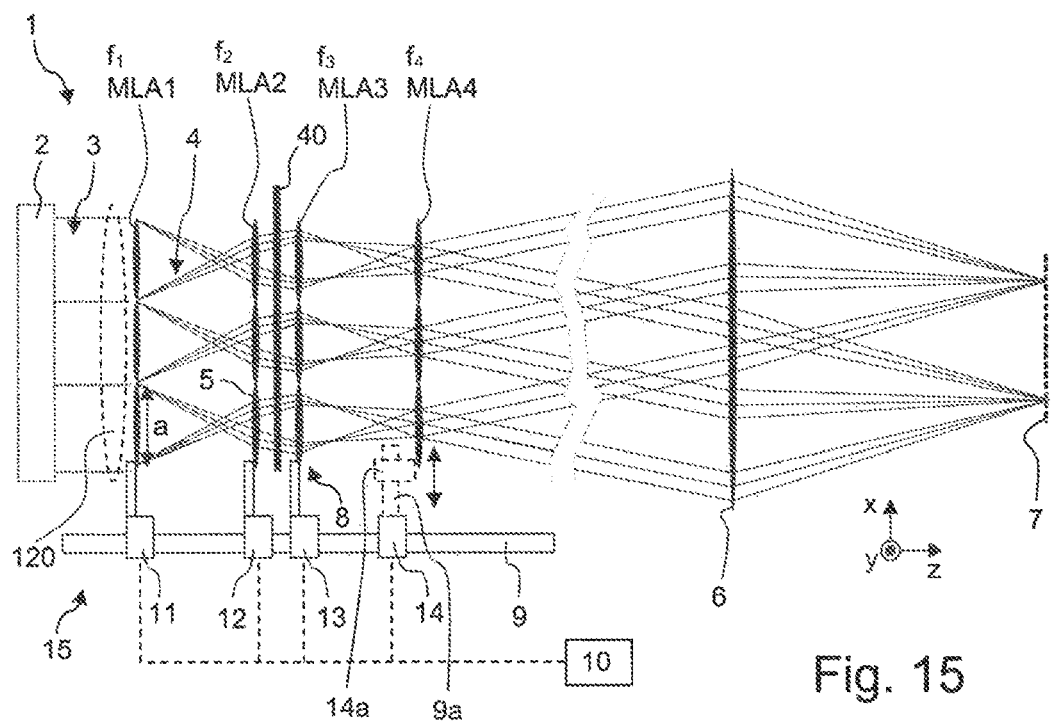
FIG. 15 shows a further embodiment of an optical assembly similar to FIG. 1, optionally equipped with a beam-forming lens and a lateral adjustment of a microlens array.

FIG. 15 shows an embodiment of an optical assembly 1 similar to FIG. 1; therefore, only the essential differences are explained hereinafter.

In the optical assembly 1, a beam-forming lens 120 can be provided in the beam path 4 before the first microlens array MLA1, which lens changes the divergence of the essentially collimated laser beam 3. The interference condition (interference situation) can thus be manipulated, using which the number of the foci in the focal plane 7 can be set, in particular an even number of foci.

Furthermore, in the optical assembly 1, the adjustment mechanism 15 can be expanded in addition to the adjustment of the slides 11-14 along the guide 9 in the z direction (beam propagation direction) and thus also the associated microlens arrays along the z direction. A further slide 14a can be used for this purpose, which is movable along a further guide 9a along the x direction, which extends transversely (perpendicularly) to the z direction. The further guide 9a is fastened here on the slide 14, and the microlens array MLA4 is fastened on the further slide 14a. Accordingly, using the adjustment mechanism 15, the microlens array MLA4 can be adjusted not only in the z direction, but also in the x direction, in particular by motor and controlled by the electronic control device 10. In particular, various lateral adjustment positions can be set with respect to the x direction. Using the adjustment mechanism 15, a lateral offset of the microlens array MLA4 can thus be configured in relation to (here) the other microlens arrays MLA1, MLA2, MLA3. The interference condition (interference situation) can thus in turn be manipulated, using which the number of the foci in the focal plane 7 can be set, in particular an even number of foci.

Figure 16:
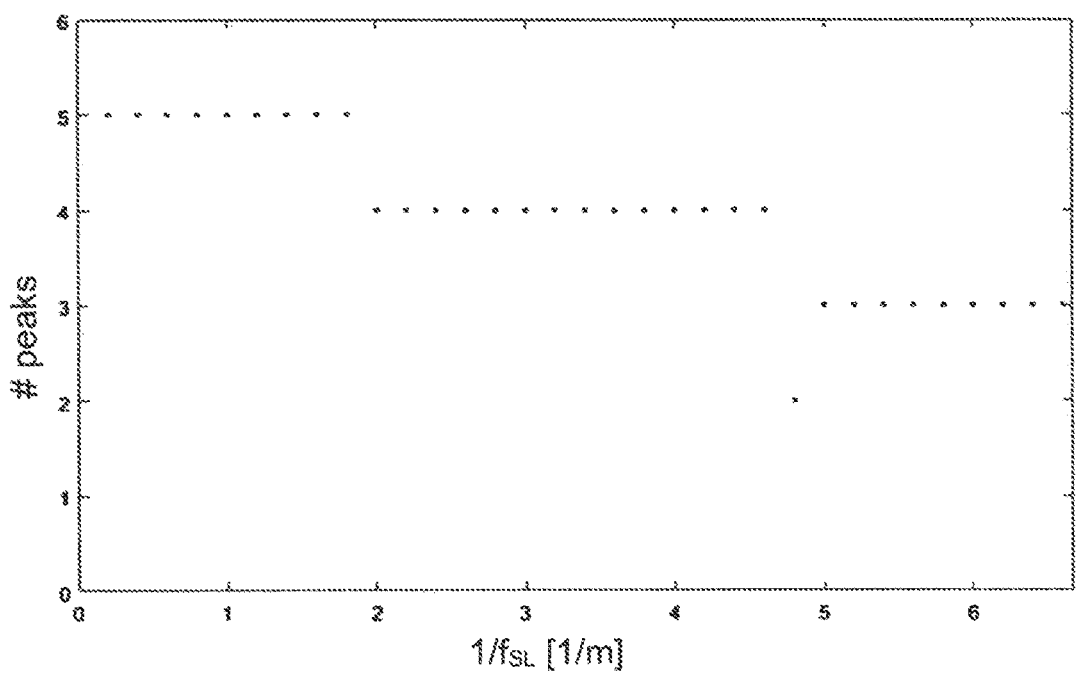
FIG. 16 shows a schematic diagram illustrating a number of foci generated using an optical apparatus as a function of the refractive power of an upstream beam-forming lens.

FIG. 16 explains the effects of the use of a beam-forming lens on the number of the foci generated using an optical apparatus, for example on a workpiece to be welded. The number of the foci (plotted upward) was determined here for a plurality of beam-forming lenses of different refractive power (cf. focal length $f_{SL}$, plotted reciprocally to the right). In the optical apparatus, two microlens arrays having a pitch of a=0.5 mm were located herein in the beam path. For a refractive power $1/f_{SL}$ of 0 to less than 2 1/m, 5 foci (peaks) resulted in each case here, for $1/f_{SL}$ of 2 to less than 5 1/m, 4 foci (peaks) resulted, and for $1/f_{SL}$ of 5 to greater than 6, 3 foci (peaks) resulted. An even number of foci can thus also be set in particular.

Figure 17:
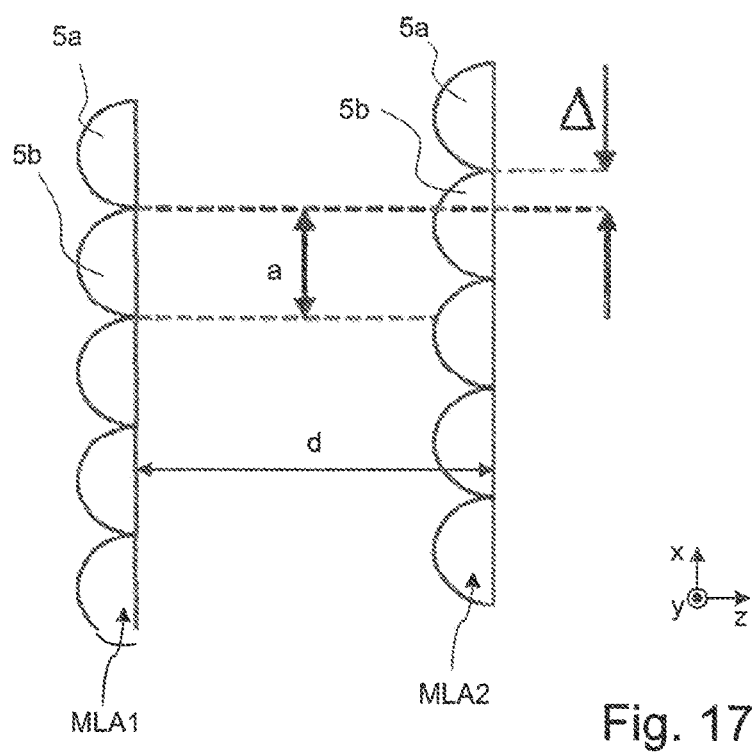
FIG. 17 shows a schematic illustration of the configuration of a lateral offset Δ and an optical distance d between two microlens arrays.

FIG. 17 explains the configuration of a lateral offset $\Delta$ between two microlens arrays MLA1, MLA2, which each comprise five microlenses here. The microlens arrays MLA1, MLA2 are arranged in succession in the beam propagation direction z, and the microlenses are arrayed along the x direction, which extends transversely (perpendicularly) to the z direction. In the x direction, the microlens arrays MLA1, MLA2 are shifted in relation to one another by the lateral offset $\Delta$. The lateral offset $\Delta$ can be read off, for example, by comparing the x position of the valleys between the two respectively upper microlenses 5a, 5b of the two microlens arrays MLA1, MLA2.

The two microlens arrays MLA1, MLA2 are moreover arranged at an optical distance d in relation to one another. With simultaneously suitable setting of the lateral offset Δ transversely to the beam propagation direction and of the optical distance d in the beam propagation direction, a desired number of foci of the multi-focus profile can be set. For an optical apparatus having two microlens arrays MLA1, MLA2 it is possible to set in particular $$\Delta = \frac{a}{2*N_i} \text{ where } N_i = \frac{a^2}{f_{ML,i}*\lambda} \text{ and } d = \frac{a^2}{(N_i-1)*\lambda},$$

whereby an even number $N_i$ of foci is obtained.

If the optical distance d is set corresponding to the effective focal length $f_{ML,i}$ of the entirety of the multilens arrays (microlens arrays), thus $$d = f_{ML,i},$$

a lateral offset Δ can be used to offset a generated multi-focus profile laterally (transversely to the beam direction) without changing the number of foci, namely corresponding to the order of diffraction B by a corresponding number of spot distances. The following is selected here $$\Delta = \frac{a}{N_i}*B,$$

where B: a positive or negative whole number.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 optical assembly
2 laser source
3 laser beam
4 beam path
5 microlens
5a, 5b microlens
6 Fourier lens assembly
7 focal plane
8 entirety of the microlens arrays/homogenizer
9 guide
9a further guide
10 electronic control device
11-14 slide
14a further slide
15 adjustment mechanism
20 multi-focus profile
21 multi-focus line profile
21a multi-focus line profile (having four foci)
21b multi-focus line profile (having two foci)
22 two-dimensional multi-focus profile
40 mirror
50 shared slide
51-53 detent recesses
54 spring-loaded detent element
60 range
61 range
71 outer peaks
72 third/fifth/seventh peak
73 second/fourth/sixth/eighth peak
90 phase shifter
91 transition (beam bundle)
92 transition (passing elements)
93 phase shifter element
94 first passing element
95 second passing element
96 thickness jump
100 wavelength-dispersive element
101 lens
102 free-form lens
110 three-dimensional object
111 zone for consolidation
112 zone for consolidation
113 zone not for consolidation
114 melt pool
120 beam-forming lens
a aperture/pitch
B order of diffraction
d distance (MLA1 to MLA2 and MLA3 to MLA4)
D width (spectrally expanded laser beam)
d1 distance (MLA1 to MLA2)
d2 distance (MLA2 to MLA3)
f1-f4 focal lengths
$f_{ML}$ effective focal length (homogenizer)
$f_{FL}$ focal length (Fourier lens assembly)
$f_{SL}$ focal length (beam-forming lens)
FN Fresnel number
g distance (foci)
MB1-MB4 microlens array components
MLA1-MLA4 microlens arrays
t distance (MLA2 to MLA3)
x direction (perpendicular to beam propagation direction)
y direction (perpendicular to beam propagation direction)
z direction (beam propagation direction)
$z_0$ starting value of additional thickness
Δ lateral offset
λ wavelength (laser beam)
λ1, λ2, λ3 wavelength components/beam components (laser beam)

What is claimed is:

1. An optical assembly for generating a multi-focus profile from an at least essentially collimated laser beam, the optical assembly comprising:
- a beam path, passing, in succession, through:
  - a microlens array assembly that includes multiple microlens arrays, wherein each microlens array of the multiple microlens arrays includes a plurality of microlenses having a uniform aperture a, and wherein the microlens array assembly has an effective focal length $f_{ML}$, and
  - a Fourier lens assembly; and
- an adjustment mechanism, configured to adjust a mutual optical distance of at least some of the multiple microlens arrays in the beam path, thereby setting the effective focal length $f_{ML}$ of the microlens array assembly, wherein the adjustment mechanism has multiple adjustment positions i=1, . . . , M, i being an adjustment position index and M being a natural number ≥2,
- wherein, each respective adjustment position i of the multiple adjustment positions satisfies the condition $$\frac{a^2}{\lambda \cdot f_{ML,i}} \sim N_i,$$

a being the uniform aperture, $\lambda$ being a center wavelength of the laser beam, $f_{ML,i}$ being the effective focal length $f_{ML}$ of the microlens array assembly set by the respective adjustment position i, and $N_i$ being a natural number.

2. The optical assembly as claimed in claim 1, wherein each of the respective adjustment positions satisfies the condition $$\left| \frac{a^2}{\lambda \cdot f_{ML,i}} - N_i \right| \leq 0.2.$$

3. The optical assembly as claimed in claim 1, wherein the beam path passes through at least three microlens arrays.

4. The optical assembly as claimed in claim 1, wherein the optical assembly comprises at least one optical deflector, and wherein the beam path passes through at least one microlens array component multiple times.

5. The optical assembly as claimed in claim 1, wherein the adjustment mechanism comprises a slide, on which at least two microlens array components are arranged at a fixed distance, and wherein the slide is movable in relation to at least one further microlens array component along the beam propagation direction (z).

6. The optical assembly as claimed in claim 5, wherein a first and third microlens array in the beam path are fixed in place and a second and fourth microlens array in the beam path are arranged on the movable slide or vice versa, and wherein, for a focal length $f_1$ of the first and fourth microlens array and a focal length $f_2$ of the second and third microlens array, the following applies: $f_2 = f_1/3$.

7. The optical assembly as claimed in claim 1, the optical assembly further comprising a wavelength-dispersive element arranged in the beam path before the microlens array assembly and configured to spectrally expand the at least essentially collimated laser beam in a direction (x) transverse to the beam propagation direction (z), wherein the Fourier lens assembly has a focal length ($f_{FL}$) variable in the direction (x) transverse to the beam propagation direction (z).

8. The optical assembly as claimed in claim 7, wherein the Fourier lens assembly is a free-form lens having a lens curvature variable in the direction (x) transverse to the beam propagation direction (z).

9. The optical assembly as claimed in claim 1, wherein the adjustment mechanism is motorized and includes an electronic control device, wherein the various adjustment positions i are programmed in the electronic control device and are automatically accessible by means of the electronic control device.

10. The optical assembly as claimed in claim 1, wherein the optical assembly further comprises a phase shifter, configured to generate, for the laser light, a phase offset of $n*\pi$, where n is an odd natural number, between the beam bundles of adjacent microlenses of the microlens arrays.

11. The optical assembly as claimed in claim 10, wherein the phase shifter is a phase shifter element, in which first passing elements and second passing elements are formed alternately in the direction (x) transverse to the beam propagation direction (z), wherein the passing of a first passing element generates the phase offset of $n*\pi$ for the laser light in relation to the passing of a second passing element.

12. The optical assembly as claimed in claim 10, wherein the phase shifter is integrated into one of the microlens arrays, wherein the profiling of the microlens array at the transition of two adjacent microlenses provides a thickness jump in each case, which generates the phase offset of $n*\pi$ for the laser light.

13. The optical assembly as claimed in claim 1, wherein the optical assembly furthermore comprises a beam-forming lens, which is arranged in the beam path before the microlens arrays,
wherein a focal length $f_{SL}$ of the beam-forming lens satisfies the condition $$\frac{1}{f_{SL}} = \frac{\lambda}{a^2}.$$

14. The optical assembly as claimed in claim 1, wherein a lateral offset $\Delta$ of at least one of the microlens arrays in relation to at least one other one of the microlens arrays with respect to at least one direction (x, y) transverse to the beam propagation direction (z) is settable using the adjustment mechanism,
wherein the adjustment mechanism has multiple lateral adjustment positions j=1, . . . , L, where j is an index of the lateral adjustment positions and L is a natural number ≥2, at which the following applies:

$$\Delta_j = \frac{a}{2*j}$$

where $\Delta_j$ is a lateral offset at the lateral adjustment position j.

15. The optical assembly as claimed in claim 1, wherein at least two of the microlens arrays in the beam path have a different focal length.

16. The optical assembly as claimed in claim 1, wherein the optical assembly is configured to generate a two-dimensionally focused multi-focus profile, wherein the microlenses of the microlens arrays are arrayed in two linearly independent directions perpendicular to the beam propagation direction.

17. A method for operating an optical assembly as claimed in claim 1, wherein different adjustment positions i are accessed in chronological succession using the adjustment mechanism, in which positions different multi-focus profiles are generated using the laser beam, which have a different number $N_i$ of foci in a direction in which microlenses of the microlens arrays are arrayed.

18. The method as claimed in claim 17, wherein an adjustment position i is also accessed using the adjustment mechanism, for which position $N_i$ is an odd number.

19. The method as claimed in claim 17, wherein an adjustment position i is also accessed using the adjustment mechanism, for which position $N_i$ is an even number, wherein during the generation of the multi-focus profile in this adjustment position i, a phase shifter is arranged in the beam path, using which phase shifter a phase offset of $n*\pi$, where n is an odd natural number, is generated between the beam bundles of adjacent microlenses of the microlens arrays.

20. The method as claimed in claim 17, wherein an adjustment position i is also accessed using the adjustment mechanism, for which position $N_i$ is an even number, wherein a beam-forming lens is arranged in the beam path before the microlens arrays,
wherein a focal length $f_{SL}$ of the beam-forming lens satisfies the condition $$\frac{1}{f_{SL}} = \frac{\lambda}{a^2}.$$

21. The method as claimed in claim 17, wherein an adjustment position i is also accessed using the adjustment mechanism, for which position $N_i$ is an even number, wherein a lateral adjustment position having a lateral offset $\Delta$, where $\Delta \neq 0$, of at least one of the microlens arrays in relation to at least one other one of the microlens arrays with respect to at least one direction transverse to the beam propagation direction is herein set using the adjustment mechanism,
wherein only two microlens arrays are arranged at an optical distance d in the beam path, where $$\Delta = \frac{a}{2*N_i} \text{ and } d = \frac{a^2}{(N_i - 1)*\lambda}.$$

22. The method as claimed in claim 17, wherein to generate the multi-focus profiles, a pulsed, at least essentially collimated laser beam having ultrashort laser pulses with a duration of 500 fs or shorter, is used,
wherein a wavelength-dispersive element is arranged in the beam path before the microlens array assembly, wherein the element spectrally expands the at least essentially collimated laser beam in a direction transverse to the beam propagation direction, and
wherein a Fourier lens assembly having a focal length variable in the direction transverse to the beam propagation direction is used in the beam path behind the microlens array assembly.

23. The use of an optical assembly as claimed in claim 1 for the additive manufacturing of objects, wherein using at least one multi-focus profile a layer of powdered material is flatly melted or flatly sintered.

* * * * *